United States Patent Office 3,082,054
Patented Mar. 19, 1963

3,082,054
METHOD FOR PRODUCING INORGANIC FIBERS
Edward F. Mayer, Novelty, and Virgil E. Straughan, Euclid, Ohio, assignors to Horizons Incorporated, Cleveland, Ohio, a corporation of New Jersey
No Drawing. Filed Aug. 10, 1960, Ser. No. 48,551
3 Claims. (Cl. 18—54)

This invention relates to the production of solid fibers based on inorganic oxide compounds produced from suitable liquid compositions. More particularly it relates to methods whereby the dimensions and specifically the ratio of length:width:thickness in such fibers is controlled by suitably controlling the process wherein the fibers are formed.

In earlier filed copending United States patent applications assigned to the same assignee as the present application, namely United States patent applications Serial No. 777,193, filed December 1, 1958; Serial No. 829,220, filed July 24, 1959; and Serial No. 11,121, filed February 26, 1960, there are described procedures for the formation of fibers based on zirconia, alumina, silica or similar oxides or mixtures of such oxides.

As described in the above-noted applications, fibers may be produced by removing liquid from suitably constituted fibering compositions prepared from sols and salt solutions when removal of the liquid is practiced under specified operating conditions. More specifically, application Serial No. 777,193 describes and claims the formation of inorganic filaments of specific aspect ratios by a method which comprises spreading a thin film of a lyophobic sol of an inorganic oxide material on a smooth solid surface of a material to which the lyophobic material does not adhere when it is dried thereon and drying the film to remove the liquid therefrom, the lyophobic sol preferably being of an inorganic oxide material selected from the group consisting of oxygen-containing compounds of silicon, zirconium, aluminum, chromium, thorium and mixtures thereof with one another and with oxides of boron. Application Serial No. 829,220 describes the preparation of filaments from the oxides of metals which are less basic than the oxides of the alkali and alkaline earth metals, and specifically from metal salts of organic acids, of the metals including aluminum, the rare earths, zirconium, hafnium, thorium, niobium, tantalum, chromium, manganese, iron, cobalt and nickel. Application Serial No. 11,121 describes the preparation of fibers consisting of a major proportion of an inorganic oxide other than silica and a minor amount of silica from a thin layer of a solution containing a metal salt of a carboxylic acid whose dissociation constant is greater than $1.5 \times 10^{-5}$; a metal salt of a strong mineral acid; and a silica sol, by exposing the thin layer of solution to infrared while it is on an infrared absorbing support, the major portion of the fiber being an oxide of an element selected from the same group of metals as those indicated to be useful in application Serial No. 829,220.

The present invention is an improvement over the previously disclosed procedures and consists in adjusting the viscosity of the fibering composition prior to effectuating the formation of fibers by removal of liquid from a relatively thin film of the fibering liquid.

It has been found that relatively coarser fibers are obtained as the viscosity and/or concentration of the fibering medium is increased and that finer fibers are obtained when the viscosity and/or concentration of the fibering medium is decreased.

For purposes of illustration the invention will be described with reference to the production of fibers of zirconia but it is to be understood that the invention is equally applicable to the production of fibers based on other inorganic oxides or mixtures of such oxides.

A fibering composition was formulated by adding enough zirconium acetate in water to form a sol with 17% $ZrO_2$ by weight and thereafter adding a sufficient amount of calcium acetate to the aqueous composition to provide a ratio of CaO to $ZrO_2$ of 4.5 to 95.5 by weight. The pH of the resulting composition was adjusted to 3.0.

When attempts were made to obtain fibers from the composition described above by applying a thin film of the composition to the surface of a rotary drum which revolves past a bank of radiant heaters which dry the film, it was found that sufficient surface thickness of the fibering liquid could not be retained on the drum surface to provide for the proper fibering mechanism and hence no fibers were formed. However, when the viscosity of the same fibering composition was altered by any of the following expedients or combinations of any of them to produce a composition with a viscosity between 6 and 14 cps., fibers were readily produced when a thin film of the otherwise identical composition was applied under the same conditions to a rotary drum. Two procedures found suitable for making the desired viscosity adjustment include:

(1) The evaporation of water from the composition in a vacuum evaporator while maintaining the solution at or above room temperature.

(2) The addition of a material which increased the viscosity of the composition without altering its chemistry.

In applying this same solution to a flat glass plate instead of a rotary drum, it was found that by an increase in the viscosity of the solution it was possible to obtain a much more uniform fiber and a greater yield of fibers from a given area of a glass plate. When heat was applied to the fibering solutions they were observed to migrate ahead of the drying meniscus until the depth of the fibering solution became so great as to destroy the propensity to participate in a fibering operation. With controlled viscosity solutions, little or no migration of the fibering solution occurred ahead of the drying meniscus and uniform drying over the entire area of the flat plate was observed.

*Example 1*

A fibering composition prepared as described above was vacuum dried to 60% of its initial volume or about 34% solids by weight. To this solution was added 23% by volume of a 1%–4000 cps. methylcellulose to bring the viscosity to 14 cps., as measured on a Brookfield viscometer. When applied to the surface of a rotary drum, as described in a copending application Serial No. 48,767, filed concurrently herewith, this composition produced fibers approximately 270 microns wide (50% fibers-50% platelets).

*Example 2*

A fibering composition identical in formulation to that in Example 1 but with only 20% of its water removed prior to use and having a 10 cps. viscosity after the addition of 4000 cps. methylcellulose, when applied to a drum and heated, produced fibers 150 to 180 microns wide with considerably reduced platelet content (30% or less).

*Example 3*

A fibering solution identical in formulation to that in Example 1 but without any water removed and exhibiting a viscosity of 6 cps. after the addition of a suitable amount of methylcellulose, produced fibers 25 to 40 microns wide with little or no platelets.

*Example 4*

A fibering solution identical in formulation to that in Example 1 but without either vacuum drying or addition of methylcellulose was found to be completely incapable of producing fibers when applied to the drum in the manner of the preceding examples.

One manner of utilizing the present invention is described in our copending application Serial No. 48,767, filed of even date herewith, wherein compositions such as those described above are applied to the surface of a rotary drum, which revolves past a bank of radiant heaters which dry the film to yield fibers which are readily scraped from the drum surface.

Still another mode of utilizing the present invention is that described in the above noted earlier filed applications, wherein heat is applied to a thin layer of fibering composition deposited on a clean inert support from which the resulting fibers readily detach themselves.

The following table illustrates the dimensions obtained using otherwise identical fibering liquid compositions except for the addition of a viscosity altering additive.

| Thickness | Length: Width | Viscosity, cps. | Fibers |
|---|---|---|---|
| 1.5μ | 100:1 | 5 | Short; very fine; 25-50 micron widths. |
| 1.5μ | | 8.5 | Short; 50-100 micron widths. |
| 3 to 4μ | 1,000:1 | 20 | Coarser and longer; 400-500 micron widths; also flakes. |

It will be evident that other thickening agents compatible with the fibering composition may be used in place of methylcellulose. For example, polyvinyl alcohol, glucose, alginates and starch may each be substituted as the thickening agent in place of methylcellulose in the practice of this invention.

Having now described our invention in accordance with the patent statutes, we claim:

1. In a method of producing inorganic filaments composed of oxide of an element selected from the group consisting of silicon, zirconium, aluminum, chromium, thorium and mixtures thereof with one another, wherein the filaments are produced as a result of the application of heat and removal of water from a thin film of an aqueous liquid composition supported on a smooth solid surface to which the filaments do not adhere; the improvement which comprises increasing the yield of fibers with dimensions within a desired range by adding a thickening agent in an amount sufficient to produce a viscosity in the aqueous liquid of between 5 and 20 centipoises prior to spreading said liquid as a thin film on said solid surface, continuously spreading said liquid on a solid surface of a rotary drum, applying heat to said film and continuously removing the resulting filaments from the surface of said drum.

2. In a method of producing inorganic filaments composed of oxide of an element selected from the group consisting of silicon, zirconium, aluminum, chromium, thorium and mixtures thereof with one another, wherein the filaments are produced as a result of the application of heat and removal of water from a thin film of an aqueous liquid composition supported on a smooth solid surface to which the filaments do not adhere, the improvement which comprises increasing the yield of fibers with dimensions within a desired range by evaporating a sufficient amount of water from said composition to produce a viscosity in the aqueous liquid of between 5 and 20 centipoises prior to spreading said liquid as a thin film on said solid surface, continuously spreading said liquid on a solid surface of a rotary drum, applying heat to said film and continuously removing the resulting filaments from the surface of said drum.

3. In a method of producing inorganic filaments composed of oxide of an element selected from the group consisting of silicon, zirconium, aluminum, chromium, thorium and mixtures thereof with one another, wherein the filaments are produced as a result of the application of heat and removal of water from a thin film of an aqueous liquid composition supported on a smooth solid surface to which the filaments do not adhere; the improvement which comprises increasing the yield of fibers with dimensions within a desired range by adding a thickening agent and by evaporating water from said liquid, to produce a viscosity in said liquid of between 5 and 20 centipoises, both of said adding and said evaporating being prior to spreading said liquid as a thin film on said solid surface, continuously spreading said liquid on a solid surface of a rotary drum, applying heat to said film and continuously removing the resulting filaments from the surface of said drum.

References Cited in the file of this patent
UNITED STATES PATENTS 2,915,475   Bugosh   Dec. 1, 1959
2,935,371   Magat   May 3, 1960